US009300355B2

(12) United States Patent
Linden et al.

(10) Patent No.: US 9,300,355 B2
(45) Date of Patent: Mar. 29, 2016

(54) FAST AUTOMATED RADIO LINK ESTABLISHMENT

(71) Applicant: Kyynel Oy, Oulu (FI)

(72) Inventors: Toni Linden, Kempele (FI); Teemu Vanninen, Oulu (FI); Matti Raustia, Oulu (FI)

(73) Assignee: Kyynel Oy, Oulu (FI)

(*) Notice: Subject to any disclaimer, the term of this patent is extended or adjusted under 35 U.S.C. 154(b) by 0 days.

(21) Appl. No.: 14/429,906

(22) PCT Filed: Sep. 23, 2013

(86) PCT No.: PCT/FI2013/050919
§ 371 (c)(1),
(2) Date: Mar. 20, 2015

(87) PCT Pub. No.: WO2014/044920
PCT Pub. Date: Mar. 27, 2014

(65) Prior Publication Data

US 2015/0256219 A1 Sep. 10, 2015

(30) Foreign Application Priority Data

Sep. 24, 2012 (FI) ...................................... 20125983

(51) Int. Cl.

| | |
|---|---|
| ***H04B 1/713*** | (2011.01) |
| ***H04B 1/7156*** | (2011.01) |
| ***H04W 56/00*** | (2009.01) |
| ***H04B 1/7136*** | (2011.01) |
| *H04B 1/7073* | (2011.01) |
| *H04B 7/185* | (2006.01) |

(52) U.S. Cl.
CPC ............ *H04B 1/7156* (2013.01); *H04B 1/7136* (2013.01); *H04W 56/0015* (2013.01); *H04B 1/7073* (2013.01); *H04B 7/185* (2013.01); *H04B 2001/71362* (2013.01); *H04B 2001/71563* (2013.01)

(58) Field of Classification Search
USPC ............ 375/133; 370/336; 455/120, 512, 450
See application file for complete search history.

(56) References Cited

U.S. PATENT DOCUMENTS

| | | | | |
|---|---|---|---|---|
| 5,530,716 | A | 6/1996 | Lipa | |
| 7,069,011 | B2 * | 6/2006 | Dalal et al. | 455/450 |
| 7,764,751 | B1 | 7/2010 | Hammell et al. | |
| 7,986,725 | B2 | 7/2011 | Alanen | |
| 2008/0144584 | A1 * | 6/2008 | Sugaya | 370/336 |
| 2009/0257422 | A1 | 10/2009 | Smith et al. | |
| 2011/0218008 | A1 * | 9/2011 | Sim et al. | 455/512 |
| 2012/0115425 | A1 * | 5/2012 | Subramani et al. | 455/120 |
| 2012/0254924 | A1 * | 10/2012 | Freundlich | 725/81 |

FOREIGN PATENT DOCUMENTS

WO WO0145288 A1 6/2001

OTHER PUBLICATIONS

International Search Report for corresponding PCT Application No. PCT/FI2013/050919, pp. 1-3, Dec. 23, 2013.

* cited by examiner

*Primary Examiner* — Eva Puente
(74) *Attorney, Agent, or Firm* — Hoffmann & Baron, LLP

(57) ABSTRACT

A radio network uses two sequences to identify a receiver of a message. The receiver is identified with a network sequence and a recipient sequence both included in the message, wherein the network sequence is a group identifier, such as a network identifier, and has better autocorrelation properties than the recipient sequence.

20 Claims, 4 Drawing Sheets

FAST AUTOMATED RADIO LINK ESTABLISHMENT

CROSS-REFERENCE TO RELATED APPLICATIONS

This application is a National Stage application of International Application No. PCT/FI2013/050919, filed Sep. 23, 2013, which claims benefit to Finnish Application No. FI 20125983, filed Sep. 24, 2012, which are incorporated by reference herein in their entirety.

BACKGROUND

1. Field

The invention relates to the field of wireless communications and, particularly, to fast link establishment in a wireless communication system.

2. Description of the Related Art

In radio communications, radio link establishment between two radio devices typically precedes data transfer between the radio devices. Fast link establishment is advantageous.

SUMMARY

The invention is defined by the independent claims.

Embodiments of the invention are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
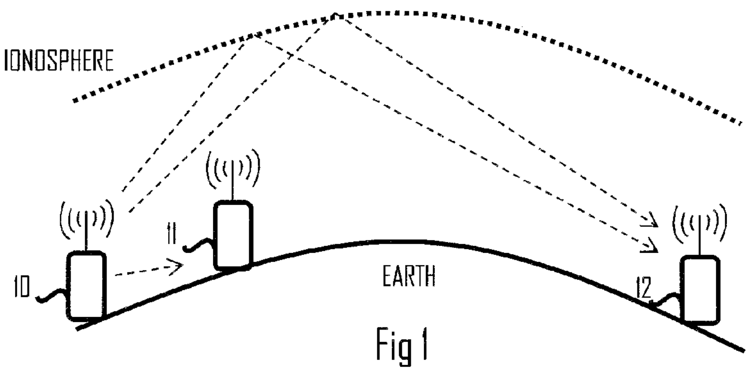
FIG. 1 illustrates a radio communication scenario to which embodiments of the invention may be applied.

FIG. 1 illustrates an example of a radio telecommunication system to which embodiments of the invention may be applied. Embodiments of the invention may be realized in a wireless ad hoc network comprising a plurality of radio devices 10, 11, 12. The ad hoc network may refer to a radio network that is established between the radio devices 10 to 12 without any network planning with respect to the infrastructure. The radio devices 10 to 12 may be operationally equivalent to each other. At least some of the radio devices 10 to 12 are free to move, and they may also be configured to route data packets that are unrelated to their own use, e.g. data packets of other radio devices of the network. However, it should be understood that principles of the invention may be applied to other types of communication systems, e.g. wireless mesh networks, communication systems having a fixed infrastructure such as cellular communication systems, and other types of systems. The principles of the invention may also be applied to point-to-point connections, wherein two radio devices communicate directly with each other without using any other radio device to route the data packets.

In the embodiment of FIG. 1, the radio devices 10 to 12 have a very long communication range (even a thousand or thousands of kilometers), and they may communicate directly with radio devices on the other side of the Earth. In general, the communication distance may extend beyond a radio horizon of the radio devices 10 to 12. A generic equation for computing the radio horizon may be presented as $D_{rh}=3.569(\sqrt{h_1}+\sqrt{h_2})$, where $h_1$ and $h_2$ represent heights of communicating radio devices. The capability of communicating beyond the radio horizon may be achieved by appropriate selection of operating frequency, e.g. the operating frequency may be restricted to below very high frequencies (VHF), but in some embodiments even frequencies on a lower half of the VHF band are used. In further embodiments, even higher frequency bands are utilized. The radio devices 10 to 12 may also communicate with satellites orbiting at the height of 160 kilometers (Low Earth Orbit, LEO), for example. From this point of view, the communication distance may be higher than a 150 kilometers.

On the other hand, the radio devices 10 to 12 may communicate with radio devices located in close distance, e.g. a few kilometers or even less. Their transmit powers may vary from a few Watts (e.g. 20 to 50 W) to even kilo Watts, depending on whether the radio device is mobile or fixed and the type of power supply. For example, a radio device installed to a building, a truck, or a ship may utilize high transmit powers, while a hand-held radio device may be limited to the few Watts. The frequency band utilized by the radio devices 10 to 12 may comprise a high frequency (HF) band (3 to 30 MHz), but it should be understood that other embodiments utilize other frequency bands, e.g. LF, MF, VHF or ultra-high frequencies (UHF). An advantage of HF frequencies is their long propagation range, and the fact that they may propagate via several types of communication paths. FIG. 1 illustrates a scenario where a first radio device 10 communicates with a second radio device 11 over surface radio waves that propagate close to the ground surface. However, a third radio device 12 on the other side of the Earth may be reached via radio waves that propagate by utilizing ionospheric reflections. Some radio devices may be reached by using both surface waves and ionospheric reflections. In some scenarios, a radio signal emitted by the first radio device 10 may reach the second radio device 11 close to the first radio device 10 through the ionospheric reflection waves. This type of propagation may be called "Near Vertical Incidence Skywave". In such scenarios, the surface radio wave component may or may not be present. Typically one of the two propagation types dominates by providing a stronger signal in the receiver.

Let us now describe channel utilization of the radio network. The radio devices 10 to 12 belonging to the same network may be synchronized with each other. The radio devices 10 to 12 may be synchronized to a common time reference provided by a global navigation satellite system (GNSS) such as GPS, Galileo, GLONASS, COMPASS, or any other currently operational or future GNSS. Instead of using the GNSS to provide the time synchronization, the radio devices may use other synchronization procedures. The radio devices 10 to 12 may negotiate with each other a common time reference and maintain synchronization to the common time reference. The time reference may be provided by a clock comprised in the radio network, for example. The synchronization may be adapted to channel hopping such that the radio devices change a channel, e.g. a frequency channel, in a synchronous manner by using a common channel list. The channel list may define timings for each channel and, thus, each radio device is able to use the time synchronization and the channel list to determine on what channel it should operate each time.

The channel list may be derived from timings and from a network security key of the radio network by using an encryption algorithm, thus providing a unique channel hopping pattern for each radio network. In another embodiment, the channel list is generated manually. The channel list may employ different channel utilization weights such that certain channels or, in general, certain parts of a radio spectrum are preferred over the others depending on the time of the day, week, and/or month, for example. The channel list may specify operation on one channel at each time interval, or it may specify a plurality of channels (a channel set) on which the radio devices 10 to 12 may operate at a given time interval. The latter embodiment provides for more channels for simultaneous use and higher channel capacity for larger networks. A radio device may negotiate reservation of a channel of the channel set, while other channels of the channel set may be used by the other radio devices. In case the radio device is capable of simultaneous multi-channel operation, e.g. it has multiple radio transceivers, it may reserve multiple channels simultaneously. In another example, the channel list comprises a plurality of overlapping or non-overlapping channel sets, and the radio device may primarily operate on one channel set but occasionally divert to operate on at least one channel of another channel set. Said one channel set may be a primary channel set allocated to the radio devices, but at least some of the radio devices may divert to another channel set in order to detect another radio network, for example.

As an example of the synchronization between the radio devices and the channel hopping, each radio device configured to receive (RX) radio messages may tune its radio receiver to an appropriate frequency channel according to the following Equation $$F\_rx = F_{min} + F_{step} \times \text{timer\_index} \quad (1)$$

where the $F_{min}$ specifies the lowest frequency channel, e.g. 3 MHz, $F_{step}$ specifies a step size for the channel frequency increments, e.g. 3 kHz, and timer_index specifies the time-dependence of the frequency hopping, e.g. timer_index=0, 1, 2 . . . 8999. The exemplary values provide a channel list where the frequency channel F_rx may range between 3 MHz to 30 MHz. The change of the timer_index may be synchronized to the same satellite system used for synchronizing the radio devices 10 to 12 with one another. For example, the timer_index may be zero at midnight (00:00:00) and start to increase by 1 every 0.8 seconds (channel dwell time is 0.8 seconds) reaching 8999 in 2 hours and, then, resetting the timer_index to 0 at (02:00:00). A transmitting radio device (TX) may use the channel list by first checking if the channel is available (idle). If the channel is available, it may start to transmit in the channel. For example if the transmitter wants to start transmission at 01:30:00, it may first convert the current time to the channel or channel index, e.g. $F_{min}+F_{step}\times(90\times60)/0.8=23,250,000$ Hz. 90 refers to the expiry of time from a reference point (90 minutes past 00:00:00), while 60 converts the minutes to seconds, and 0.8 is the step size for the timer_index. Then, the transmitting radio device may checks if thus derived frequency channel is available. If the channel is available, it may start the transmission. Since receivers are listening to transmissions according to an algorithm agreed beforehand, the transmission may be carried out without usage of any specific control channel.

According to other possibility the timer_index formula is function of time and location. Location can be used as one input for the Equation (1), for example, such that the "midday sun" i.e. the time when sun is in the highest position at the location of the transmitting/receiving radio device, is used in conjunction with the time reference acquired from the GNSS. Rationale of this is that certain frequencies have better propagation during daytime than at night and vice versa. Additionally, the latitude and longitude coordinates can be used to calculate day rise and dawn times in perspective areas. Thus, the radio devices 10 to 12 may be configured to construct the active channel list by determining the channels associated with their own location and, additionally, the channel associated with the location at least one other radio device of the same radio network. The radio devices may keep track of the respective locations of the other radio devices of the same radio network in order to derive a common channel list and channel hopping sequence.

In another embodiment, the channels of the channel list are selected according to another criterion. In general, an arbitrary channel selection procedure may be used to obtain the channel list comprising a subset of all available channels.

Different radio networks may in some embodiments employ the same set of channels but the channel lists and channel hopping patterns may be orthogonal such that no two radio networks operate on the same channel or set of channels simultaneously. For example, two radio networks may employ the same channel set and the same channel hopping pattern but with different timing offsets, e.g. when or slightly after a first radio network hops from a first channel set to a second, different channel set, a second radio network may hop to the first channel set.

As indicated above, a currently active channel forms a subset of all channels, wherein the number of currently active channels with respect to the all channels is substantially low. For example, the total number of channels may be in the order of hundreds, thousands, or even more, while the currently active subset of channels may at least a decade lower, e.g. less than ten channels. The radio devices 10 to 12 may scan the active set of channels in connection with transmitting and/or receiving transmissions. The radio devices 10 to 12 may employ carrier sensing multiple access (CSMA) for channel contention before transmitting and, with respect to reception, they may scan for transmissions addressed to them.

Figure 2:
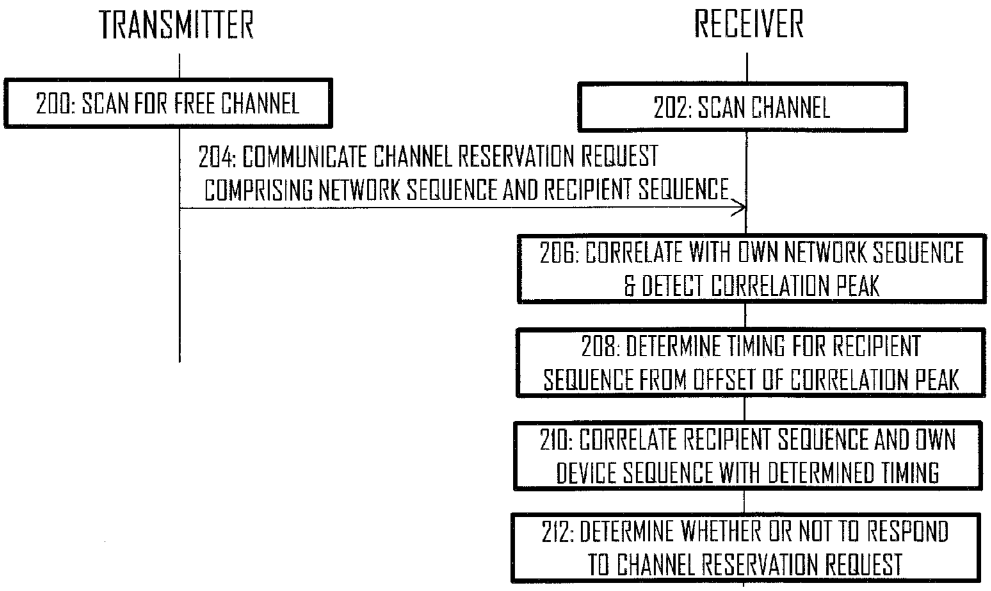
FIG. 2 illustrates a link establishment procedure according to an embodiment of the invention.

FIG. 2 illustrates a signalling diagram of an embodiment of the invention for identifying radio devices 10 to 12 in the radio network. Some of the steps of FIG. 2 are carried out in one radio device 10 to 12 called "a transmitter" while other steps are carried out in another radio device 10 to 12 called "a receiver". The transmitter is a radio device having data to be transmitted to the receiver, and the receiver is a radio device scanning for transmissions addressed to it.

Referring to FIG. 2, the transmitter radio device scans a predetermined list of channels for a free channel in block 200 in order to carry out the data transmission. Meanwhile, the receiver radio device scans in block 202 the same or at least overlapping set of channels for any transmission addressed to it. The term "free channel" may be defined as a channel not currently being used by any other radio device. Such a channel may be called an idle channel. The transmitter may use any channel sensing mechanism to determine whether a channel is free or busy, e.g. clear-channel assessment based on a level of radio energy on a channel. Upon detecting a free channel, the transmitter carries out transmission of a channel reservation request message addressed to at least one receiver radio device on the channel in step 204. Let us assume that the at least one receiver radio device comprises the receiver of FIG. 2. The receiver(s) are identified with a network sequence and a recipient sequence both comprised in the reservation request message. The network sequence may be unique to the radio network and it may have better autocorrelation properties than the recipient sequence. In an embodiment, the network sequence is defined as a group sequence shared by a plurality of network devices. The network sequence thus identifies the radio network or a group of devices and the recipient sequence identifies the receiver(s). In an embodiment, the recipient sequence identifies a subset of the group of devices. The recipient sequence may be an arbitrary sequence with arbitrary correlation properties.

Upon detecting in block 204 the channel reservation request message on one of the channels it scans, the receiver starts a procedure for determining whether or not the message is addressed to the receiver. The procedure comprises correlating the network sequence of the channel reservation request message with the network sequence of the radio network of the receiver (block 206) and determining, on the basis of the correlation, a first timing which results in a correlation peak indicating that the network sequence of the channel reservation request message is the network sequence of the radio network of the radio device. The correlation may be carried out by a correlator or by a matched filter matched to a waveform of the network sequence of the radio network of the receiver. In the case of the correlator, the first timing may be considered as a first timing offset between the network sequence that is being searched for and a sample sequence representing the received message. In the case of applying the matched filter to the received message, the first timing may be considered as a timing at which the output of the matched filter exceeds a threshold level indicating that the current input to the matched filter matches with the waveform of the matched filter, thus indicating the correlation peak. The detection of the correlation peak may be realized by any peak detection algorithm, e.g. by comparing the output of the correlator or the matched filter with a threshold level.

If no correlation peak is detected, the receiver may determine that the message is not addressed to any radio device in the radio network of the receiver and skip blocks from 208 onwards.

As the presence of the correlation peak is a direct indication of the presence of the searched network sequence, there is no need to decode the bit values of the received network sequence.

In block 208, the first timing is used in determining a second timing for use in correlating the recipient sequence. In an embodiment, the network sequence is used to synchronize the receiver to the received message or signal and, upon determining the location of the network sequence in the received message, the receiver may use the location of the network sequence to determine the location of the recipient sequence in the received message. Further embodiments are described below.

The radio device thus uses the signal received as the network sequence for the dual purpose: as a synchronization sequence for synchronizing to the message and as the direct identifier of the network sequence. Both synchronization and the detection of the network sequence may be carried out with the correlation procedure, because the detection of the correlation peak provides the knowledge that the searched network sequence has been found and that the synchronization with the message has been achieved.

In block 210, the recipient sequence of the channel reservation request message is correlated with at least one identification sequence of the radio device by using the second timing. On the basis of the combined correlation results of the network sequence and the recipient sequence it may be determined (block 212) whether or not the radio device is an intended recipient for said data transfer. If the correlation between the recipient sequence of the channel reservation request message and the at least one identification sequence of the radio device results in a correlation peak with the second timing, the receiver may determine that it is an intended receiver of the channel reservation request message. It may then respond to the request by transmitting a channel reservation response message indicating to the transmitter that the receiver was able to receive the request and is ready for the transmission. The transmitter may then transmit payload data on the same channel reserved with the transmission of at least one of the channel reservation request and channel reservation response message.

In an embodiment, the decoding of the bit values of the detected recipient sequence is omitted. The presence of the correlation peak as itself serves as an indication that the searched sequence has been detected. By not decoding the bits of the network sequence and/or or the recipient sequence upon the reception of the channel reservation message, robustness of the system may be increased and complexity of the channel reservation message handshaking may be reduced. The robustness may be increased, for example, in embodiments using spread spectrum chips instead of conventional bits (to be decoded) as the network sequence and/or the recipient sequence, which introduces well known processing gain in the reception. The reduction in the complexity is due to the fact that requirements for channel coding or adaptive equalizing during the handshake period may relaxed or such processing may even be omitted. In embodiments using short network or device identifiers, e.g. only a few number of bits that are then spread into a high number of chips, channel coding might not even provide significant gain. The length of a spreading sequence used to spread the bits of the network and/or device identifiers may be 32 chips, for example.

In embodiments where the recipient address is a group address, a broadcast address, or a geocast address, the transmission of the channel reservation response message may be omitted and the transmitter radio device may proceed to transmitting data without waiting for the response to the channel reservation request.

The above-described embodiment enables the use of the network sequence as a synchronization sequence for the recipient sequence. In a conventional solution, the recipient sequence identifying the receiver is selected to have high autocorrelation and cross-correlation properties. The recipient sequence should not correlate highly with an offset of itself (autocorrelation) or with other sequences (cross-correlation) or, otherwise, probability of false alarms increases. The number of such sequences is low, typically the number available recipient sequences is close to the length of the recipient sequence, e.g. when the recipient sequence is 32 bits (or chips or samples) the number of available sequences having good correlation properties is close to 32. This leads to that either the number of devices in the network is low or the length of the recipient sequence is high. The present invention uses the network sequence to determine a correct timing for the recipient sequence. The network sequence is selected to have good correlation properties and, since the number of radio networks is significantly smaller than the total number of radio devices in all radio networks, it is not necessary to increase the length of the network sequence to accommodate all the radio networks.

In an embodiment, the network sequence is a spreading code sequence. Spreading code sequences are designed for use in spread spectrum communications and to have good autocorrelation properties. The use of the network sequence with better correlation properties helps in determining the timing of the recipient sequence. This reduces the number of correlations computed for the recipient sequence and, thus, the probability of false alarms even if the recipient sequence had poor autocorrelation properties. The receiver may correlate its identification sequence(s) with the recipient sequence with only said second timing or, additionally, with other timings close to the second timing. It also enables the use of an arbitrary sequence as the recipient sequence. The recipient sequence may even have correlation properties that would make the recipient sequence unusable for its purpose without the network sequence.

The poor correlation properties may be defined as a ratio between the level of the correlation peak and the level of sidelobes acquired with different offsets between the two sequences being correlated. If the level of any sidelobe increases with respect to the level of the correlation peak, the correlation properties of the sequence decrease and the risk of a false alarm increases. The selection of network sequence having sufficiently good correlation properties may be made by the skilled person through analysis of the correlation properties of different sequences and by testing their performance in simulations and in real test scenarios. The invention itself is not limited to the network sequences having correlation properties that exceed a certain level. It suffices that the network sequence has better correlation properties than the recipient sequence.

The use of the network sequence as the synchronization sequence also reduces the need for an additional pilot sequence. The network sequence may also serve as the pilot sequence, and the receiver(s) may compute a channel estimate, interference estimate, or other channel parameters from the network sequence.

The channel reservation request message may be a request-to-send (RTS) message, and channel reservation response message may be a clear-to-send (CTS) message. The RTS message may indicate the channel reservation to the other radio device which may then suspend their transmissions on the channel for a determined period of time.

In an embodiment, the identification sequence of the receiver is a device address of the receiver, e.g. a medium access control (MAC) address. The device address may also be defined as a unicast address. In another embodiment where the radio system employs broadcasting, the identification sequence may be a broadcast address. In another embodiment where the radio system employs multicasting, the identification sequence may be a multicast address of a multicast group to which the receiver belongs. In another embodiment where the radio system employs geocasting, the identification sequence may be a geocast address computed by the receiver from its geographical location. The radio devices 10 to 12 may employ a common geographical location map divided into areas, e.g. a military grid reference system (MGRS). The transmitter may determine a geocasting area in which it chooses to transmit the data and compute the recipient sequence from a geographical code representing the geocasting area. For example, the MGRS employs a MGRS grid reference as a point reference system. When the term 'grid square' is used, it can refer to a square with a side length of 10 kilometers (km) equivalent to 6 miles (mi), 1 km, 100 m (328 feet), 10 m or 1 m, depending on the precision of coordinates provided. The number of digits in the numerical location may be even: 0, 2, 4, 6, 8 or 10, depending on the desired precision. When reducing the precision level of the location, coordination values may be truncated. As a consequence, the desired geocasting area may be determined by selecting the desired precision level and truncating a corresponding number of location coordinate digits. Then, the recipient sequence may be computed from the remaining location coordinate digits according to a determined conversion algorithm dependent on the values of the remaining location coordinate digits, and the recipient sequence may be added to the channel reservation request message. Similarly, any receiver may compute possible geocasting identifiers related to its location, and the correlation of the recipient sequence may be carried out with the different geocasting identifiers. The geocasting identifiers used by the receiver may represent different precisions.

Figure 3:
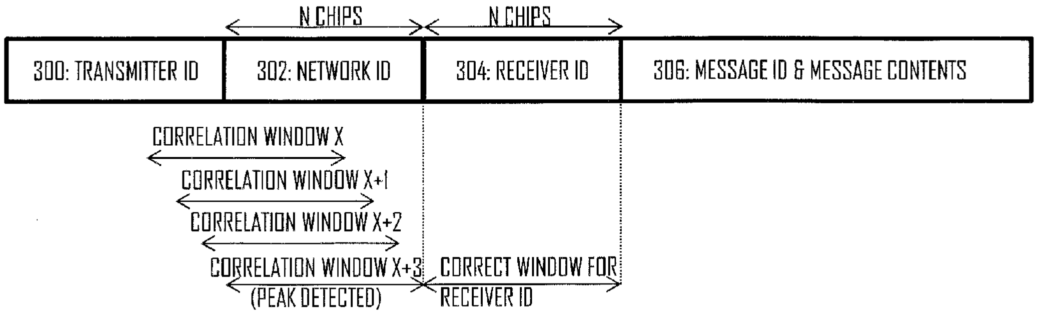
FIG. 3 illustrates correlation of a received signal in a radio receiver according to an embodiment of the invention.

Let us now consider the contents of the reservation request message and the use of the network sequence in determining the correct timing for the recipient sequence in more detail with reference to FIG. 3. Referring to FIG. 3, the reservation request message may comprise a transmitter identifier 300 identifying the transmitter of the message, the network identifier 302 indicating the radio network of at least the receiver of the message, the recipient identifier 304 identifying the receiver of the message and other contents 306. The other contents may comprise a message identifier identifying the message as the channel reservation request message, a traffic type identifier indicating a classification of the data traffic intended for transmission, e.g. a quality-of-service (QoS) classification, etc. The length of the network sequence 302 and the recipient sequence 304 may be the same (N chips) but, in some embodiments, the lengths may differ. Similarly, in this embodiment the recipient sequence 304 follows immediately the network sequence 302 but, in other embodiments, the location of the recipient sequence with respect to the network sequence is different. What matters is that the receiver knows the location of the recipient sequence with respect to the network sequence and their respective lengths.

In an embodiment, the network sequence precedes at least the recipient sequence in the reservation request message. Accordingly, the size of a memory buffer may be reduced as there is no need to buffer samples before the start of the network sequence in preparation for that the buffered samples may comprise the recipient sequence and, optionally other sequences. Accordingly, the order of the sequences in the reservation request message may be arranged to comply with the order of processing the sequences in the receiver.

In an embodiment, the transmitter identifier 300 is omitted from the reservation request message. It is not necessary at this stage for the receiver to know which device attempts to establish the connection. Upon detecting the reservation request message, the receiver may respond with a general response message which neither comprises the transmitter identifier as the recipient sequence. The transmitter of the request may still detect the response message as being addressed to it on the basis of an implicit link between the request and the response, e.g. that the response is transferred on the same channel as the request and within a pre-specified time interval from the transmission of the request.

Let us now assume a situation where the receiver correlates a received signal with the network sequence with different timing offsets therebetween. The receiver may employ a sliding correlator or a matched filter computing the correlation between the received signal with the network sequence of its radio network and sliding one with respect to the other. At this stage, the receiver may not be aware of the timing of the message so it uses the network sequence to determine the correct timing with which synchronization with the received signal is acquired. The sliding correlation is illustrated in FIG. 3 by the correlation with different, incremental offsets X, X+1, X+2, X+3. The correlation length corresponds to the known length of the network sequence of the radio network.

In this case, the sliding correlation indicates a correlation peak with the offset X+3, thus indicating the match between the network sequence of the radio network and the network sequence comprised in the received message. The receiver may then use the offset X+3 (the above-mentioned first timing) and the known location of the recipient sequence 304 with respect to the network sequence 302 to derive a starting point for the correlation between the recipient sequence 304 and at least one identifier of the receiver (the above-mentioned second timing). In the example of FIG. 3 where the recipient sequence 304 follows the network sequence 302, the starting point is a sample following the last sample of the received signal used in the correlation with the timing offset X+3, while the ending point is a sample located N chips after the sample of the starting point. The correlation is thus made with samples between the starting point and the ending point, including these points, and the at least one identifier of the receiver. In another embodiment where the recipient identifier 304 follows the network identifier 302 by Y samples, the starting point is a sample following the last sample of the received signal used in the correlation with the offset X+3 by Y samples, while the ending point is a sample located N chips after the sample of the starting point. Analogously, when the recipient identifier 304 precedes the network identifier 302 by Z samples, the starting point is a sample Z samples before the last sample of the received signal used in the correlation with the offset X+3 (Z>N), while the ending point is a sample located N chips after the sample of the starting point.

Figure 4:
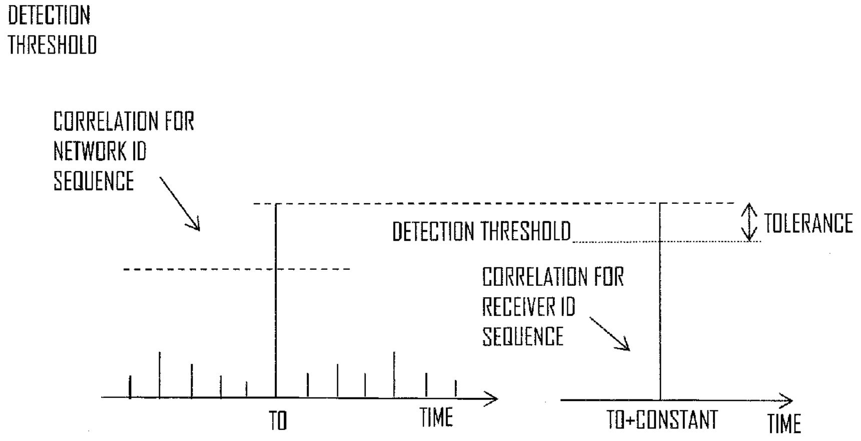
FIG. 4 illustrates computation of a detection threshold in the radio receiver according to an embodiment of the invention.

In an embodiment, the receiver uses not only the first timing to determine the second timing but also the level of the correlation peak achieved with the first timing in the correlation of the recipient sequence 304. FIG. 4 illustrates an embodiment for using the level of the correlation peak achieved with the first timing as a reference level for peak detection when correlating the recipient sequence 304 with the second timing. In the example of FIG. 3 where the network sequence 302 and the recipient sequence 304 have the same length (N chips), the respective correlation peaks have the same or substantially the same level when using the correct timing offset, i.e. X+3 for the network sequence and a corresponding window for the recipient sequence. The reasoning is that both the network sequence 302 and the recipient sequence 304 experience similar distortion and, as a consequence, the correlation with network sequence having better correlation properties may be used also in setting an appropriate detection threshold for the recipient sequence.

Referring to FIG. 4, let us assume that the correlation with the network sequence results in a correlation peak exceeding a detection threshold with a timing TO (the first timing). The level of the correlation peak may then be used in determining a detection threshold for the recipient sequence. In FIG. 4, term "constant" refers to the known separation or offset between the locations of the network sequence and the recipient sequence. The detection threshold for the recipient sequence may be higher than the detection threshold of the network sequence because of poorer correlation properties, e.g. stronger correlation with wrong offsets (stronger sidelobes). With the higher detection threshold, the number of false alarms may be reduced. When using the level of the correlation peak computed for the network sequence, the probable level of the correlation peak for the recipient sequence is known and the detection threshold of the recipient sequence may be set to a correct level which reduces the probability of a false alarm and increases the probability of positive correlation result, if the recipient sequence matches with the receiver's identification sequence. Since levels of the correlation peaks computed for the network sequence and the recipient sequence probably do not have exactly the same values, the receiver may set a tolerance range for the detection threshold of the recipient sequence and lower the detection threshold with respect to the correlation peak value of the network sequence, as indicated in FIG. 4. In some embodiments, the detection threshold of the recipient sequence may still be higher than the detection threshold of the network sequence.

In operation, if the correlation of the recipient sequence with at least one of the identification sequences of the receiver exceeds the corresponding detection threshold for the recipient sequence, the receiver may determine that it is an intended receiver of the channel reservation request message.

In an embodiment where the length of the recipient sequence is different from the length of the network sequence, the computation of the detection threshold for the recipient sequence may comprise scaling the correlation peak level acquired from the correlation with the network sequence. A scaling factor may be defined as a ratio between the lengths of the sequences as Length(recipient sequence)/Length(network sequence).

Figure 5:
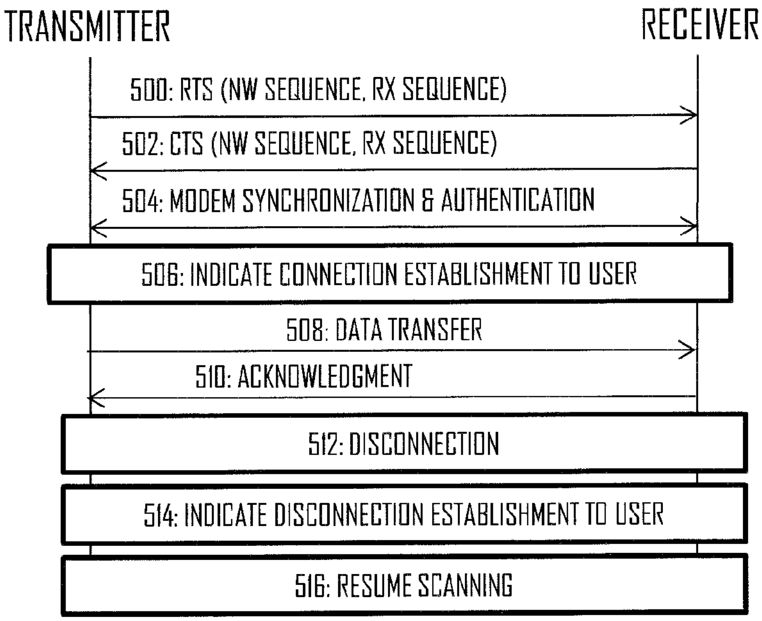
FIG. 5 illustrates connection establishment and operation between radio devices according to an embodiment of the invention.
Figure 6:
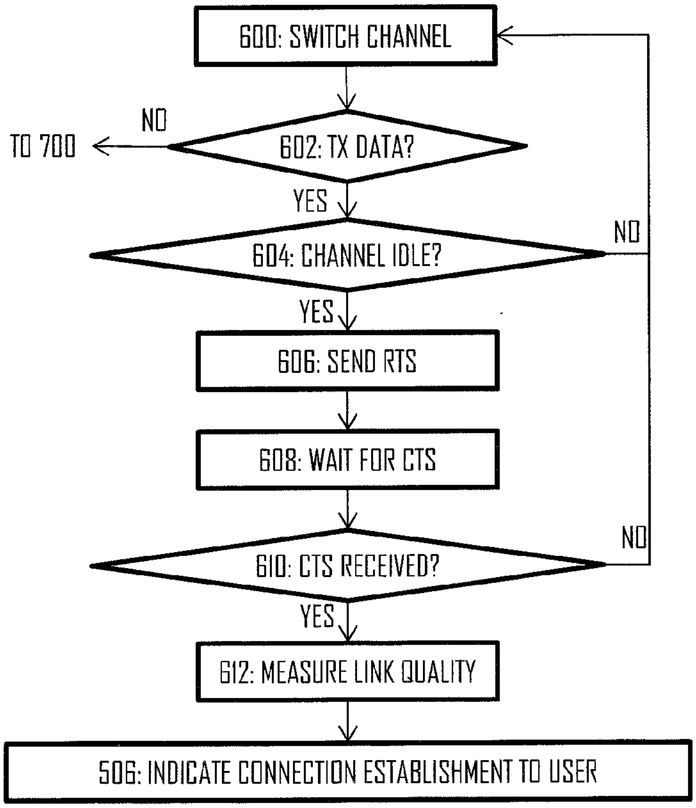
FIG. 6 illustrates a flow diagram of the operation of a transmitter in link establishment according to an embodiment of the invention.
Figure 7:
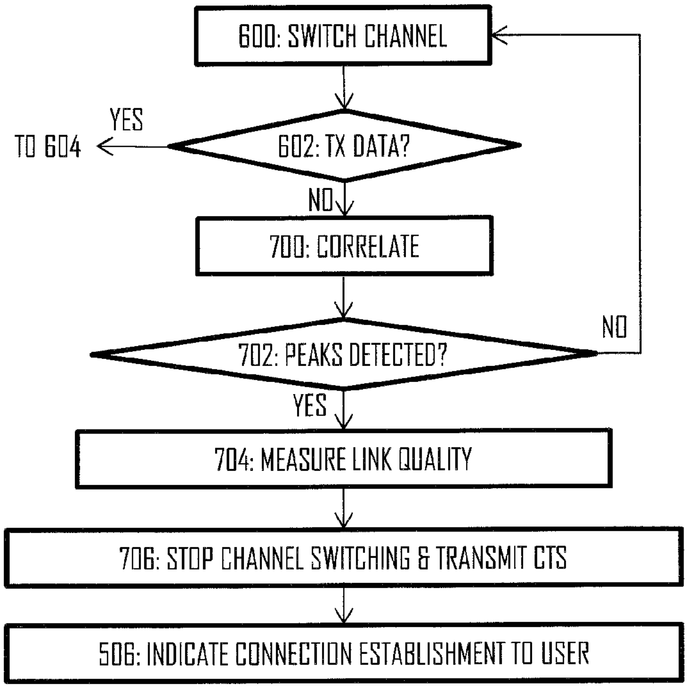
FIG. 7 illustrates a flow diagram of the operation of a receiver in link establishment according to an embodiment of the invention.

Let us now consider the operation of the above-described transmitter and receiver, each realized by one of the radio devices 10 to 12, in a bigger picture with reference to FIGS. 5 to 7. FIG. 5 illustrates a signalling diagram illustrating communication between the transmitter and the receiver, while FIGS. 6 and 7 illustrate detailed flow diagrams of respective operations in the transmitter and in the receiver, respectively.

Referring to FIG. 5, let us assume an initial situation where both the transmitter and receiver utilize synchronous channel switching and scan the same channel for a message comprising the network identifier and a receiver identifier associated with itself. In block 500, the transmitter determines that it has data to be transmitted to the receiver and, as a consequence, it transmits the channel reservation request message (RTS) on the channel. The RTS message comprises the network sequence shared by the transmitter and the receiver and a recipient sequence indicating the receiver. In block 502, upon detecting that the receiver is the intended recipient for the RTS by using correlation according to any embodiment described herein, the receiver derives a transmitter identifier from the RTS message, forms a channel reservation response message (CTS) and adds an identifier of the transmitter as a recipient sequence to the CTS, and transmits the CTS to the transmitter. Meanwhile, the transmitter scans the channel for the CTS message, e.g. by first correlating with the network identifier and, upon detecting a peak, then correlating with the transmitter identifier as described herein for the receiver. As a consequence, the network sequence may be used as a correlation reference for the recipient sequence with respect to messages other than the RTS message. Upon receiving the CTS in block 502 and detecting that the CTS message is addressed to the transmitter, the transmitter and the receiver carry out mutual synchronization and authentication related to the establishment of a radio connection between them in 504.

In another embodiment, the receiver derives forms the channel reservation response message (CTS) and adds an identifier of the receiver as the recipient sequence to the CTS, and transmits the CTS to the transmitter. In this embodiment, the transmitter may scan the channel for the CTS message comprising the same combination of the network identifier and the device identifier as comprised in the RTS message it transmitted, e.g. by first correlating with the network identifier and, upon detecting a peak, then correlating with the recipient sequence comprised in the RTS message. As a consequence, the network sequence may be used as a correlation reference for the device identifier with respect to messages other than the RTS message. Upon receiving the CTS in block 502 and detecting that the CTS message is addressed to the transmitter, the transmitter and the receiver carry out mutual synchronization and authentication related to the establishment of a radio connection between them in 504.

In an embodiment, the CTS message may be an arbitrary message, e.g. identical to the RTS message. A response time interval after the transmission of the RTS may be provided for transmitting the CTS, and the transmitter may identify transmission of a message on the same channel as the RTS as the CTS message any specific analysis of the recipient sequence of the CTS message. The transmitter may, however, carry out the detection of the network sequence before identifying a received message as the CTS. If the network sequence is correct and received within the specified time interval, the transmitter may identify the message as the CTS.

After the connection has been established, the transmitter and the receiver may each indicate to their respective users about the completion of the connection establishment (block 506). Thereafter, data may be transmitted from the transmitter and received in the receiver in block 508, and the receiver may acknowledge correct reception of the data in block 510. After the data transfer, e.g. after all the data has been transmitted or a channel dwell time expires, the transmitter and the receiver negotiate disconnection of the connection in block 512 and indicate the completion of the disconnection to the users (block 514). Thereafter, the radio devices may resume scanning on the same channel 516 or tune to a next channel according to the channel hopping pattern.

In an embodiment, the transmitter and the receiver stay on the channel after the connection establishment until the data transfer has been completed regardless of the channel hopping pattern. The channel hopping pattern may thus be used as a common reference for scanning purposes and for facilitating link establishment. After the link establishment between two radio devices on a channel, the radio devices may occupy the channel for data transfer while other radio devices may continue the channel hopping according to the channel hopping pattern.

Let us now consider the operation of a radio device 10 to 12 acting as the transmitter in greater detail with reference to FIG. 6. Referring to FIG. 6, the radio device switches to a new channel according to the channel hopping pattern in block 600. In block 602, the radio device determines whether or not it has data to be transmitted on this channel. If it does not have data to be transmitted at the moment, it may adopt the role of the receiver (see FIG. 7) until it has data to be transmitted. If there is data to be transmitted, the process proceeds to block 604 in which the channel is sensed to determine whether it is idle or occupied. If the channel is determined to be occupied till the expiry of the channel dwell time, the process returns to block 600. On the other hand, if the channel is idle, the radio device proceeds to block 606. Block 604 may comprise checking from a database a status of previous contacts with the intended receiver on the current channel and determining on the basis of such status information the probability for successful communication on the current channel. If the status information indicates that the current channel has resulted in failed communication with the intended receiver, the process may return to block 600. On the other hand, if the status information indicates that the current channel has resulted in failed communication with the intended receiver, the process may proceed to block 600. The radio devices 10 to 12 may store at least the channel information and channel status of any previous communication link in the database and, thus, determine channels that may be used for communication with each of the other radio devices at different timings. For example, one radio device cannot be typically reached on a given channel at a given time because of temporary interference, but it can be reached on another channel at a different timing.

In block 606, the radio device transmits the RTS and starts to scan the channel for a CTS comprising the network identifier and the device identifier of the radio device (block 608). There may be provided a time window within which the RTS should be transmitted within the channel dwell time. For example, a first part of the dwell time (e.g. 40 ms from an 80 ms dwell time) may be allocated for the transmission of the RTS, while a latter part of the dwell time may be allocated to the transmission of the CTS. If the CTS is not detected within the time window (block 610), the radio device returns to block 600. On the other hand, if the CTS is detected in block 610, the radio device may measure a link quality from the CTS message in block 612, e.g. from the network identifier comprised in the CTS message. The link quality may be stored in a database in order to keep track of link qualities with different radio devices of the same radio network. The radio device may also store information on successful communication with the receiver upon detecting the CTS. Accordingly, the radio device may update the above-described status information. If the radio device knows the location of the receiver, it may include the location information in the database as linked to the status information on the current channel. On the other hand, upon detecting no CTS, the radio device may store information on the failed communication as the status information in the database. If the link quality is sufficient for communication, the connection with the receiver may be established and the connection establishment may be indicated to the user (block 506). On the other hand, if the link quality is poor, the radio device may return to block 600.

Now, let us consider the operation of the radio device in the role of the receiver (NO in block 602). Upon determining that the radio device has no data to be transmitted, it monitors the channel for a message addressed to it in block 700. The monitoring may be realized by correlating received signals with a network sequence of the radio network of the radio device. After detecting the correlation peak, the radio device proceeds to determining the above-described second timing and correlating the received signal with at least one identifier of the radio device by using the second timing. If this correlation also results in a correlation peak (block 702), the process proceeds to block 704. Otherwise, the process returns to block 600 and the radio device switches to a next channel. If the received message is the RTS message, the radio device may measure the link quality from the received RTS message, e.g. from the network identifier, and store the link quality in a memory. If the link quality is sufficient, the radio device may transmit the CTS message, stop the channel hopping, and wait for a link establishment command from the transmitter of the RTS message in block 706. The radio device may determine the transmitter of the RTS message by using again the first timing resulting in the correlation peak with the network sequence and known location of the transmitter identifier with respect to the network sequence in the RTS message to determine a third timing. The radio device may then correlate the received signal with known radio device identifiers by using the third timing until it detects a correlation peak. The radio device having the radio device identifier resulting in the correlation peak is determined to be the transmitter, and the CTS message is addressed to that radio device. Upon establishment of the link, the radio device may indicate the link establishment to the user (block 506).

Figure 8:
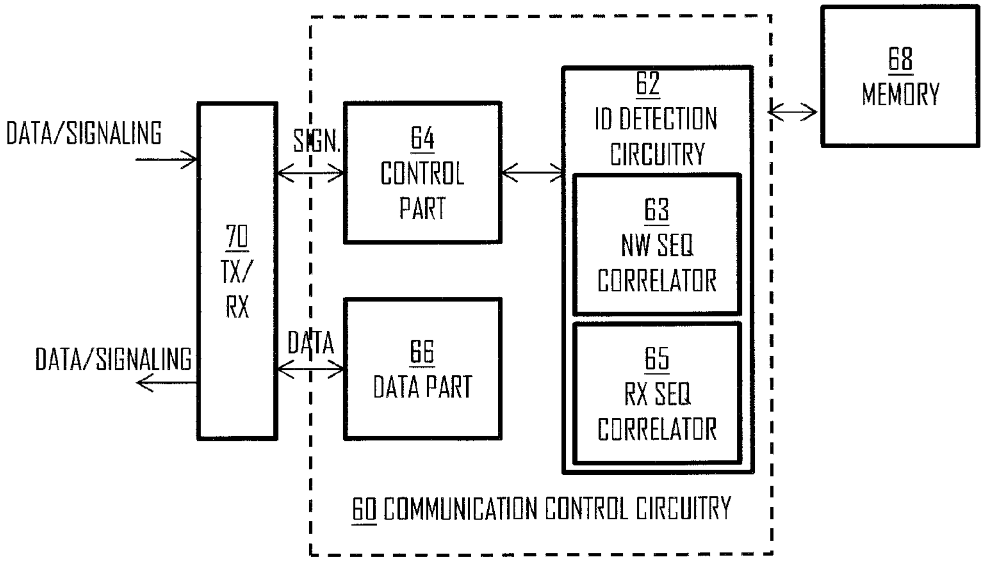
FIG. 8 is a block diagram illustrating a structure of a radio device according to an embodiment of the invention.

FIG. 8 illustrates an embodiment of an apparatus comprising means for carrying out the functionalities of the radio device 10 to 12 according to any one of the above-described embodiments. The apparatus may be a radio device implemented as a mobile device, e.g. a computer (PC), a laptop, a tabloid computer, a portable radio phone, a mobile radio platform (installed to a vehicle such as a truck or a ship), or any other apparatus provided with radio communication capability. In some embodiments, the apparatus is the vehicle equipped with the radio communication capability. In other embodiments, the apparatus is a fixed station, e.g. a base station. In further embodiments, the apparatus is comprised in any one of the above-mentioned radio devices, e.g. the apparatus may comprise a circuitry, e.g. a chip, a processor, a micro controller, or a combination of such circuitries suitable for the radio device.

The apparatus may comprise a communication controller circuitry 60 configured to control the communications in the radio device 10 to 12. The communication controller circuitry 60 may comprise a control part 64 handling control signalling communication with respect to establishment, operation, and termination of the radio connections. The control part 64 may also carry out any other control functionalities related to the operation of the radio links, e.g. transmission, reception of the control messages, e.g. the RTS/CTS messages, acknowledgment messages, and/or headers of data packets carrying control information. The communication controller circuitry 60 may further comprise a data part 66 that handles transmission and reception of payload data over the radio links.

The communication controller circuitry 60 may further comprise an identifier detection circuitry 62 configured to analyse signals received from a radio channel through the control part 64 and attempt detection of a network identifier of the radio network of the radio device and an identifier associated with the radio device or a group of radio devices comprising the radio device. In other words, the identifier detection circuitry 62 attempts to detect a combination of at least two identifiers from a received signal that would indicate that the radio device is an intended recipient for a message comprised in the received signal. The identifier detection circuitry 62 may comprise a network sequence correlator 63 realized by a correlator or a matched filter adapted to a waveform of the network identifier of the radio network of the radio device. The network sequence correlator 63 may also comprise a peak detector monitoring the output of the correlator or the matched filter for a peak exceeding the above-mentioned network sequence detection threshold. Upon detecting a peak exceeding the detection threshold, the network sequence correlator 63 may activate a recipient sequence correlator 65 and input to the recipient sequence correlator 65 a timing offset and a peak level value associated with the detected peak. The recipient sequence correlator may be realized by another correlator or another matched filter adapted to a waveform of at least one of the identifiers associated with the radio device itself. Such an identifier may be a MAC address of the radio device, a stream identifier associated with a data stream used by the radio device, a unicast, multicast, geocast, or a broadcast address of the radio device etc. The recipient sequence correlator 65 may use only the timing offset received from the network sequence correlator 63 and the location of the recipient sequence with respect to the network sequence known beforehand in determining the timing offset for the correlation of the recipient sequence. However, the recipient sequence correlator may also carry out the correlation with at least one timing offset around the "correct" timing offset. The recipient sequence correlator 65 may also comprise a peak detector monitoring the output of the correlator or the matched filter for a peak exceeding the above-mentioned recipient sequence detection threshold. Upon detecting a correlation peak exceeding the recipient sequence detection threshold, the recipient sequence correlator may output a corresponding signal to the control part 64 or the data part, depending on the type of message received. If the received message is the RTS message, the control part 64 may carry out a transmission of a corresponding CTS message to a transmitter derived from the RTS message. If the received message is data, the data part 66 may carry out detection of payload data.

The circuitries 62 to 66 of the communication controller circuitry 60 may be carried out by the one or more physical circuitries or processors. In practice, the different circuitries may be realized by different computer program modules. Depending on the specifications and the design of the apparatus, the apparatus may comprise some of the circuitries 60 to 66 or all of them.

The apparatus may further comprise a memory 68 that stores computer programs (software) configuring the apparatus to perform the above-described functionalities of the radio device 10 to 12. The memory 68 may also store communication parameters and other information needed for the radio communications. For example, the memory 68 may store the above-mentioned identifiers the apparatus is attempting to detect from the received signals and/or the above-described database storing the status information.

The apparatus may further comprise radio interface components 70 providing the apparatus with radio communication capabilities with other radio devices. The radio interface components 70 may comprise standard well-known components such as amplifier, filter, frequency-converter, analogue-to-digital (A/D) and digital-to-analogue (D/A) converters, (de)modulator, and encoder/decoder circuitries and one or more antennas. The apparatus may further comprise a user interface enabling interaction with the user. The user interface may comprise a display, a keypad or a keyboard, a loudspeaker, a smartcard and/or fingerprint reader, etc.

An embodiment provides an apparatus comprising at least one processor and at least one memory including a computer program code, wherein the at least one memory and the computer program code are configured, with the at least one processor, to cause the apparatus to perform the functionalities of the radio device 10 to 12 in the role of the transmitter and/or the receiver, as described herein in connection with FIGS. 2 to 7.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor (s) or processor cores; or (ii) portions of processor(s)/ software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/ or a field-programmable grid array (FPGA) circuit for the apparatus according to an embodiment of the invention.

The processes or methods described in FIGS. 2 to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless telecommunication systems defined above but also to other suitable telecommunication systems. The protocols used, the specifications of such systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

What is claimed is:

1. A method for processing a received message in a radio device of a radio network, the method comprising in the radio device:

scanning predetermined channels;

receiving a signal on a channel;

correlating the received signal with a network sequence shared by the radio device and at least one other radio device of the radio network with a plurality of timings and determining, on the basis of the correlation, a first timing which results in a correlation peak indicating that the received signal comprises the network sequence;

using the first timing in determining a second timing;

correlating the received signal with at least one identification sequence of the radio device by using the second timing; and determining, on the basis of the correlation of the received signal with the at least one identification sequence of the radio device, whether or not the received signal comprises a recipient sequence indicating that the received signal comprises a message addressed to the radio device.

2. The method of claim 1, further comprising determining the second timing from the first timing and from known timing offset of the recipient sequence with respect to the network sequence in the message.

3. The method of claim 1, further comprising:

determining a height of the correlation peak indicating that the received signal comprises the network sequence of the radio network;

using the height of the correlation peak in generation of a detection threshold value for the recipient sequence;

if the correlation with the at least one identification sequence results in a correlation peak having a height greater than the detection threshold value, determining that the radio device is the intended recipient of the message; and upon determining that the radio device is the intended recipient of the message, causing the radio device to transmit a response message.

4. The method of claim 1, wherein the received signal is correlated with the at least one identification sequence of the radio device by using only the second timing.

5. The method of claim 1, wherein said network sequence is a spreading code sequence.

6. The method of claim 1, wherein the network sequence and the recipient sequence have the same length.

7. The method of claim 1, wherein the predetermined channels are scanned synchronously with a channel hopping sequence of other radio devices of the radio network.

8. A method of addressing a receiver radio device of a radio network, the method comprising, in a transmitter radio device of the radio network:

scanning, using the transmitter radio device, predetermined channels for a free channel; and upon detecting the free channel, causing transmission, using the transmitter radio device, of a message addressed to at least one receiver radio device, the message comprising a network sequence and a recipient sequence, the network sequence and the recipient sequence identifying at least one receiver radio device, the network sequence being unique to a group of radio devices and having better autocorrelation properties than the recipient sequence, thereby enabling use of the network sequence as a synchronization sequence for synchronizing to the message and as a direct identifier of the network sequence.

9. The method of claim 8, wherein the predetermined channels are scanned synchronously with a channel hopping sequence of other radio devices of the radio network.

10. An apparatus, comprising:

at least one processor and at least one memory including a computer program code, wherein the at least one memory and the computer program code are configured, with the at least one processor, to cause the apparatus to perform operations comprising:

scanning predetermined channels;

receiving a signal on a channel;

correlating the received signal with a network sequence shared by the apparatus and at least one other apparatus, of the same radio network as the apparatus, with a plurality of timings and determine, on the basis of the correlation, a first timing which results in a correlation peak indicating that the received signal comprises the network sequence;

using the first timing in determining a second timing;

correlating the received signal with at least one identification sequence of the apparatus by using the second timing; and determining, on the basis of the correlation of the received signal with the at least one identification sequence of the apparatus, whether or not the received signal comprises a recipient sequence indicating that the received signal comprises a message addressed to the apparatus.

11. The apparatus of claim 10, wherein the operations further comprise determining the second timing from the first timing and from known timing offset of the recipient sequence with respect to the network sequence in the message.

12. The apparatus of claim 10, wherein the operations further comprise:

determining a height of the correlation peak indicating that the received signal comprises the network sequence of the radio network;

using the height of the correlation peak in generation of a detection threshold value for the recipient sequence;

if the correlation with the at least one identification sequence results in a correlation peak having a height greater than the detection threshold value, determining that the apparatus is the intended recipient of the message; and upon determining that the apparatus is the intended recipient of the message, causing transmission of a response message.

13. The apparatus of claim 10, wherein the operations further comprise correlating the received signal with the at least one identification sequence of the apparatus by using only the second timing.

14. The apparatus of claim 10, wherein said network sequence is a spreading code sequence.

15. The apparatus of claim 10, wherein the network sequence and the recipient sequence have the same length.

16. The apparatus of claim 10, wherein the predetermined channels are scanned synchronously with a channel hopping sequence of other apparatuses of the radio network.

17. An apparatus comprising:

at least one processor and at least one memory including a computer program code, wherein the at least one memory and the computer program code are configured, with the at least one processor, to cause the apparatus to perform operations comprising:

scanning, using a transmitter radio device, a-predetermined list of channels for a free channel; and upon detecting the free channel, causing transmission, using the transmitter radio device, of a message addressed to at least one receiver apparatus, the message comprising a network sequence and a recipient sequence, the network sequence and the recipient sequence identifying at least one receiver apparatus, the network sequence being unique to a group of radio devices and having better autocorrelation properties than the recipient sequence, thereby enabling use of the network sequence as a synchronization sequence for synchronizing to the message and as a direct identifier of the network sequence.

18. The apparatus of claim 17, wherein the predetermined channels are scanned synchronously with a channel hopping sequence of other apparatuses of the radio network.

19. The apparatus of claim 17, wherein said network sequence is a spreading code sequence.

20. The apparatus of claim 17, wherein the network sequence and the recipient sequence have the same length.

* * * * *